United States Patent
Cole

(10) Patent No.: US 6,981,857 B2
(45) Date of Patent: *Jan. 3, 2006

(54) APPARATUS AND METHOD FOR LOCKING A TIRE VULCANIZING PRESS

(76) Inventor: John R. Cole, 1033 Top of the Hill, Akron, OH (US) 44333

( * ) Notice: Subject to any disclaimer, the term of this patent is extended or adjusted under 35 U.S.C. 154(b) by 0 days.

This patent is subject to a terminal disclaimer.

(21) Appl. No.: 11/054,568

(22) Filed: Feb. 9, 2005

(65) Prior Publication Data

US 2005/0136145 A1   Jun. 23, 2005

Related U.S. Application Data

(63) Continuation of application No. 10/222,742, filed on Aug. 16, 2002, now Pat. No. 6,908,584.

(51) Int. Cl.
*B29C 35/02* (2006.01)

(52) U.S. Cl. .......................................... 425/38; 425/47
(58) Field of Classification Search ............... 425/34.1, 425/38, 47, 195, 451.9; 264/326
See application file for complete search history.

(56) References Cited

U.S. PATENT DOCUMENTS

| | | |
|---|---|---|
| 2,911,670 A | 11/1959 | Soderquist |
| 3,336,635 A | 8/1967 | Soderquist |
| 3,540,081 A | 11/1970 | Carrieri et al. |
| 3,936,251 A | 2/1976 | Billey |
| 3,976,409 A | 8/1976 | Athey |
| 4,130,384 A | 12/1978 | MacMillan |
| 4,453,902 A | 6/1984 | Imbert |

(Continued)

FOREIGN PATENT DOCUMENTS

DE   198 17 822 A1   10/1999

(Continued)

OTHER PUBLICATIONS

Brochure on "Column Guide/Rod Lock Type Hydraulic Tire Curing Press Model LT-XL 51R 350SP", by Mitsubishi Heavy Industries, Ltd.

(Continued)

*Primary Examiner*—James P. Mackey
(74) *Attorney, Agent, or Firm*—Brouse McDowell; Roger D. Emerson; Heather M. Barnes

(57) ABSTRACT

A tire press has an upper mold fixedly attached to a top plate. A bottom mold is fixedly attached to a bottom plate. The tire press has a plurality of guide posts adapted to maintain proper alignment of the upper mold and the lower mold as the tire press opens and closes. A plurality of lock rods, which are independent of the guide posts, are positioned about the tire press. Each of the lock rods has a first end and a second end. The lock rods may have an adjustment mechanism positioned on the first end of the lock rods to adjust the various mold heights. Locking means are a part of the tire press, which are adapted to selectively engage the second end of the lock rods. Further, each of the lock rods has cylinder mechanism operatively connected to the locking means. The cylinder mechanism is adapted to force the locking means to the surface of the lock rods. The cylinder mechanism is a hydraulic cylinder having the piston disposed within the chamber. The piston has a release side and a squeeze side, such that when fluid is introduced on the squeeze side, a substantially equal amount of tension is placed on the lock rods to lock the tire press. When fluid is introduced on the release side, the locking means can be removed from the lock rods and the tire press can be opened.

16 Claims, 4 Drawing Sheets

U.S. PATENT DOCUMENTS

| | | |
|---|---|---|
| 4,601,648 A | 7/1986 | Amano et al. |
| 4,950,141 A | 8/1990 | Maikuma et al. |
| 5,194,267 A | 3/1993 | Funakoshi et al. |
| 5,238,394 A | 8/1993 | Hirata |
| 5,259,742 A | 11/1993 | Ichikawa et al. |
| 5,409,361 A | 4/1995 | Ichikawa et al. |
| 5,601,850 A | 2/1997 | Ureshino |
| 5,683,726 A | 11/1997 | Mitamura et al. |
| 5,743,616 A | 4/1998 | Giuliano et al. |
| 5,776,507 A | 7/1998 | Ureshino et al. |
| 5,798,123 A | 8/1998 | Mitamura et al. |
| 6,908,584 B2 * | 6/2005 | Cole .......................... 264/326 |
| 2002/0086088 A1 | 7/2002 | Romi |

FOREIGN PATENT DOCUMENTS

| | | |
|---|---|---|
| EP | 0 468 344 A1 | 1/1992 |
| EP | 0 488 261 A1 | 6/1992 |
| FR | 1 314 771 | 1/1963 |
| JP | 59-71842 | 4/1984 |
| JP | 5-96547 | 4/1993 |
| WO | WO 00/35665 | 6/2000 |

OTHER PUBLICATIONS

Brochure on "Hydraulic Curing Presses for Passenger, Truck, Tractor and Earth-Mover Tires", by Krupp Elastomertechnik a company of ThyssenKrupp Technologies.
International Search Report—Dated Jan. 21, 2004—4 pages.
International Search Report—Dated Jul. 14, 2004—11 pages.

* cited by examiner

APPARATUS AND METHOD FOR LOCKING A TIRE VULCANIZING PRESS

This application is a continuation application claiming priority from a utility patent application filed on Aug. 16, 2002, having Ser. No. 10/222,742, which issued as U.S. Pat. No. 6,908,584. Inventorship remains the same.

I. BACKGROUND OF THE INVENTION

A. Field of Invention

This invention pertains to the art of methods and apparatuses for locking a tire press.

More specifically, the present invention pertains to the art of methods and apparatuses for locking a tire press wherein a cylinder mechanism is utilized to provide substantially equal tension in all locking rods such that the tolerances for the length of each of the lock rods is not as critical as in known locking devices.

B. Description of the Related Art

It is known in the art for tire presses to have a locking mechanism so that a tire mold is secure during a curing cycle. Current devices utilize lock rods which must be substantially identical in length. As such, the lengths must be very precise and is very critical. The dimension is very critical because when a tire press closes and locks, if any of the lock rods are slightly longer than another one, the shorter rod sees more forces and loads. This results in an uneven load distribution which results in uneven strains and stresses. This may eventually cause tire defects because upper and lower tire molds may no longer be parallel. Further, the lock rods need to be over designed to take into consideration the fact that some of the lock rods may encounter more loads than others.

In other known designs, tension is place on the lock rods; however, the lock rods and the guide posts of the tire press are the same mechanism. In this case, guide posts that have a locking mechanism integrated therein encounter increased maintenance. This is because guide posts should only be used for guiding the upper and lower mold halves open and closed during curing cycles. When actual forces are placed on guide posts through a locking mechanism, forces may cause deflection in the guide posts over time. As such, guide posts need routine maintenance.

The present invention provides methods and apparatuses for locking a tire press, which has independent lock rods and guide posts, and does not require the lock rods to be exactly equal in length, and yet, provides equal tension and axial forces in all the lock rods when the tire press is closed and locked.

II. SUMMARY OF THE INVENTION

According to one aspect of the present invention, a new and improved locking mechanism for a tire press is provided. A tire press has an upper mold fixedly attached to a top plate. A bottom mold is fixedly attached to a bottom plate. The tire press has a plurality of guide posts adapted to maintain proper alignment of the upper mold and the lower mold as the tire press opens and closes. A plurality of lock rods, which are independent of the guide posts, are positioned about the tire press. Each of the lock rods has a first end and a second end. The lock rods may have an adjustment mechanism positioned on the first end of the lock rods to adjust for various mold heights. Locking means are a part of the tire press and are adapted to selectively engage the second end of the lock rods. Further, each of the lock rods has cylinder mechanism operatively connected to the locking means. The cylinder mechanism is adapted to extend the locking means to the surface of the lock rods. The cylinder mechanism may be a hydraulic cylinder having the piston disposed within the chamber. The piston has a release side and a squeeze side, such that when fluid is introduced on the squeeze side, a substantially equal amount of tension is placed on the lock rods to lock the tire press. When fluid is introduced on the release side, the locking means can be removed from the lock rods and the tire press can be opened.

Another object of the present invention is to provide an apparatus having a lock rod with first end, a second end, and a surface; locking means operatively connected to the lock rod; and, cylinder mechanism operatively connected to the locking means, wherein the cylinder mechanism is adapted to extend the locking means to the surface of the lock rod, the cylinder mechanism also being adapted to place tension on the lock rods.

Still yet, another object of the present invention is to provide a tire press where the locking means is a split lock ring.

Another object of the present invention is to provide a tire press wherein the lock rod is moveable relative to the top plate.

Further, another object of the present invention is to provide a tire press, wherein the lock rod is threaded on the first end.

Still yet, another object of the present invention is to provide a tire press, wherein tension in each of the lock rods is substantially equal.

Further, another object of the present invention is to provide a method for locking the tire press comprising the steps of:

providing a tire press having an upper mold and a lower mold, a lock rod having a first end and a second end, the lock rod having a surface, locking means, and, cylinder mechanism operatively connected to the locking means, wherein the cylinder mechanism is adapted to extend the locking means to the surface of the lock rod;

closing the tire press;

locking the locking means to said lock rod;

placing tension on the lock rod with the cylinder mechanism; and, locking the tire press.

Still, another object of the present invention is to provide a method for locking the tire press wherein the step of placing tension on the lock rod with the cylinder mechanism further comprises the step of injecting a fluid on the squeeze side of the piston.

Still, another object of the present invention is to provide a method for unlocking the tire press further comprising the steps of:

injecting fluid on the release side of the piston;

removing fluid from the squeeze side of the piston;

releasing the locking means; and unlocking the tire press.

It is yet another object of the present invention to provide an improved loader/unloader system with the tire press.

It is yet another object of the present invention to provide a tire press that is more compact in size such as to eliminate the need for a pit in the factory floor and additional width.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
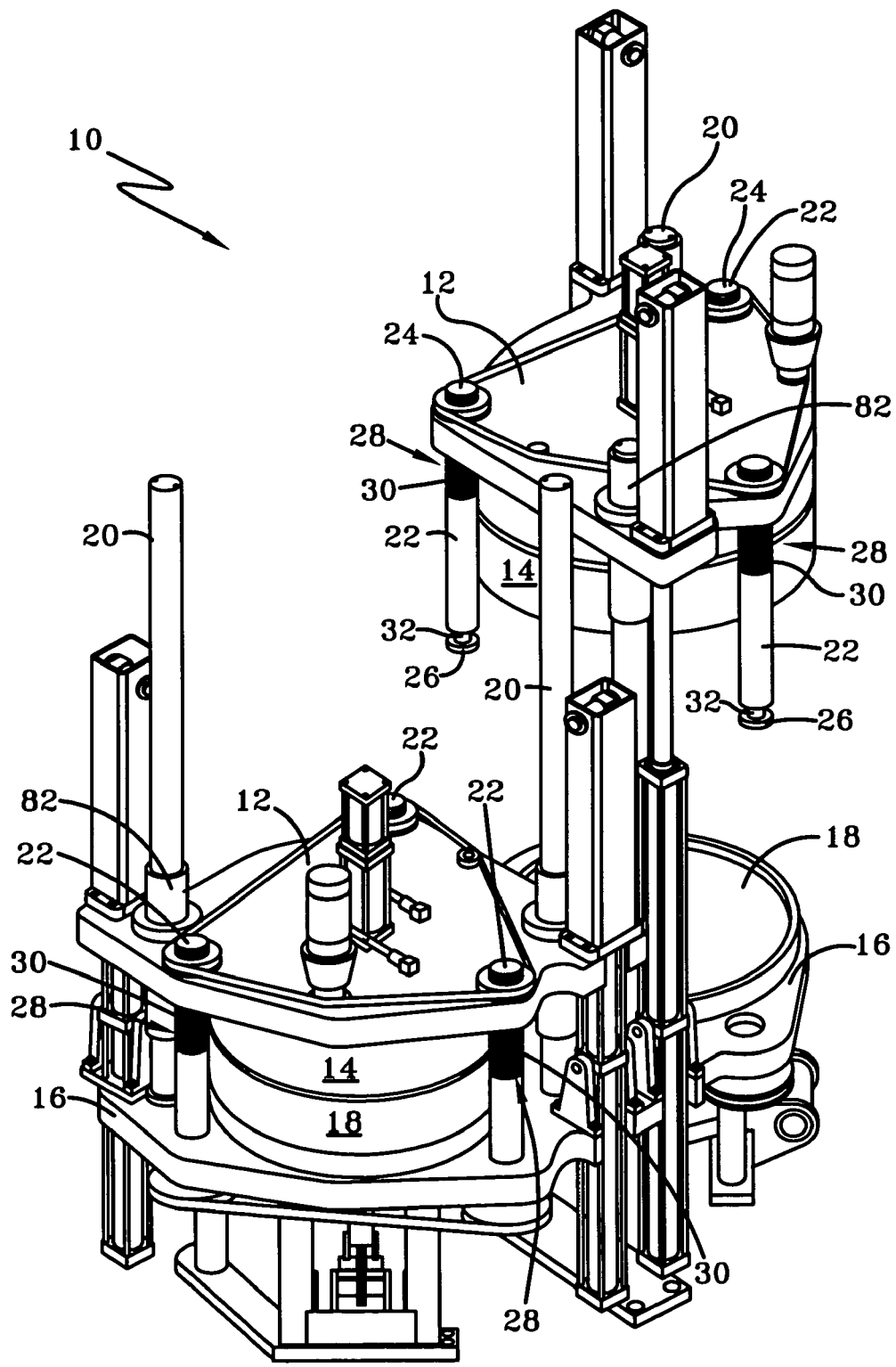
FIG. 1 is a perspective view of a hydraulic curing press.

Referring now to the drawings wherein the showings are for purposes of illustrating a preferred embodiment of the invention only and not for purposes of limiting the same, FIGS. 1–5 show the present invention.

With reference to FIGS. 1–4 a tire press 10 is shown. A tire press 10 may take the form of two single cavity machines that work independently. The tire press comprises a top plate 12 having an upper mold 14 rigidly affixed thereto. A bottom mold 18 is fixedly attached to the bottom plate 16. The bottom mold 18 and upper mold 14 contact each other and maintain alignment through a plurality of guide rods 20.

The tire press 10 further comprises a plurality of lock rods 22, which passes through the top plate 12. Each of the lock rods has a first end 24, a second end 26, and a surface 32. The second end 26 may be notched. The purpose of the lock rods 22 is to maintain tight and even seal between the upper mold 14 and bottom mold 18 during a curing cycle. It is important that the lock rods 22 be independent from the guide rods 20. In order to achieve optimal sealing and closure between the upper and bottom molds 14, 18, only the lock rods 22 should be utilized. If guide rods 20 are utilized to perform a locking function in the tire press 10, the guide rods 20 will experience unwanted deflection, which could ultimately result in imperfect sealing of the molds 14, 18 during a curing cycle.

Figure 2:
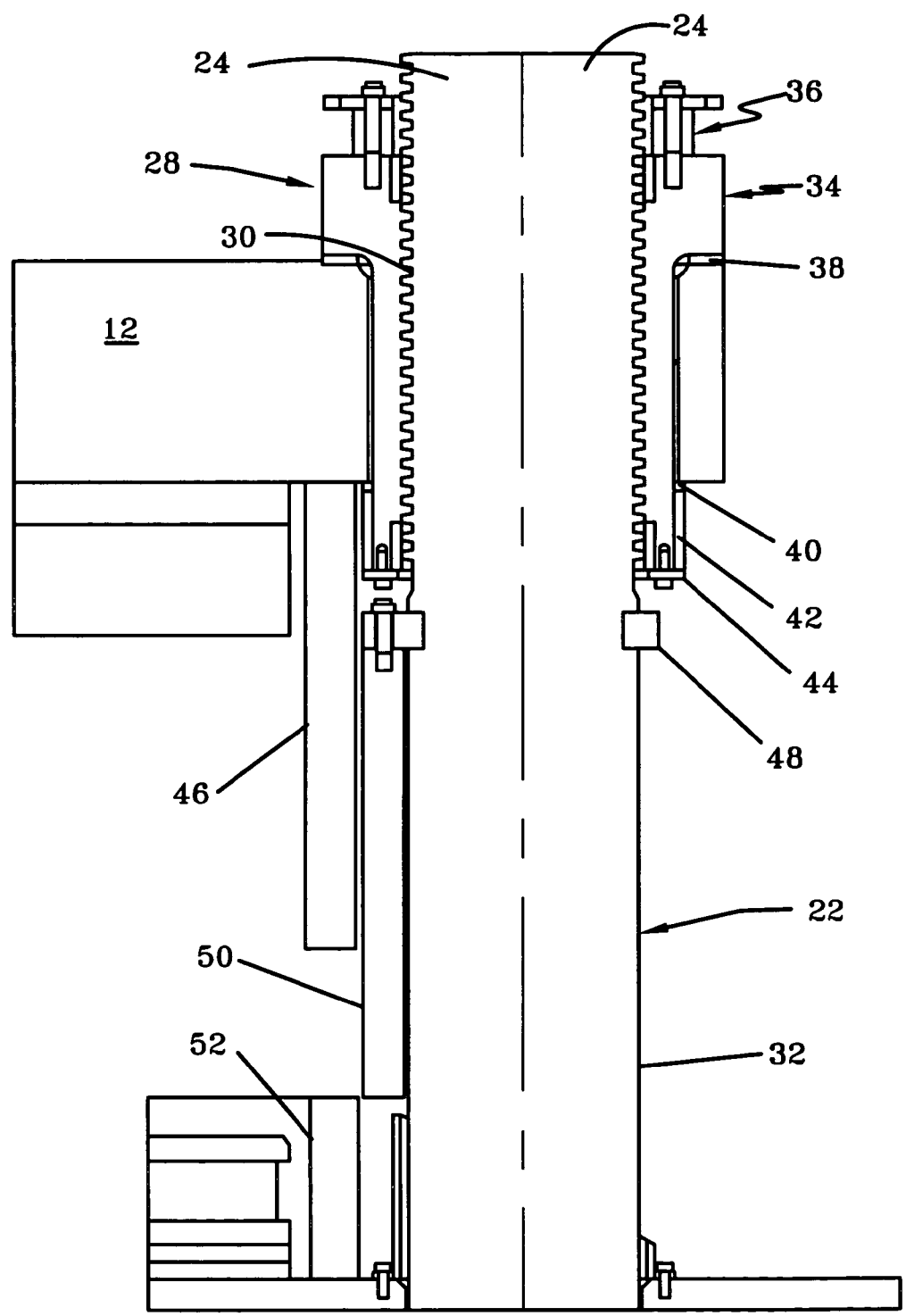
FIG. 2 is a cross-sectional view of the top of a lock rod disposed within the top plate of the tire press in FIG. 1.

With reference to FIG. 2, the first end 24 of the lock rod 22 may comprise an adjustment mechanism 28. Any adjustment mechanism may be utilized that is chosen with sound engineering judgment; however, as shown in the figures, the adjustment mechanism 28 shown is threads 30. The adjustment mechanism 28 has an adjusting screw sprocket 36, which attaches to an adjusting nut 34. Because the lock rods 22 pass through the top plate 12, the lock rod 22 is moveable relative to the top plate 12 through the adjustment mechanism 28 described herein. A top adjusting thrust washer 38 and a bottom adjusting thrust washer 40 are shown. These washers 38, 40 are adapted to take up any thrust and axial load experienced during the locking of the tire press 10. Further, an adjusting nut spacer 42 and adjusting nut retaining ring 44 aid the adjustment mechanism 28 and the lock rod 22. The lock rod 22 passes through a hole in the bottom plate 16. A top heat shield 46, middle heat shield 50 and bottom heat shield 52 are utilized to prevent excessive heat from escaping the mold. Further, a lock rod anti-rotation bracket 48 prevents rotation of the lock rods 22.

With reference to FIG. 2, the heat shields 46, 50 and 52 will now be explained in further detail. The top heat shield 46 is attached to the top plate 12. The middle heat shield 50 is attached to the lock rod 22, and the bottom heat shield is attached to the bottom plate 16. Because a middle heat shield 50 is attached to each of the lock rods 22 at the proper dimension, this enables the middle heat shield 50 to automatically adjust to the proper height to shield the mold. As such, heat shield adjustment is concurrent with lock rod adjustment.

Figure 4:
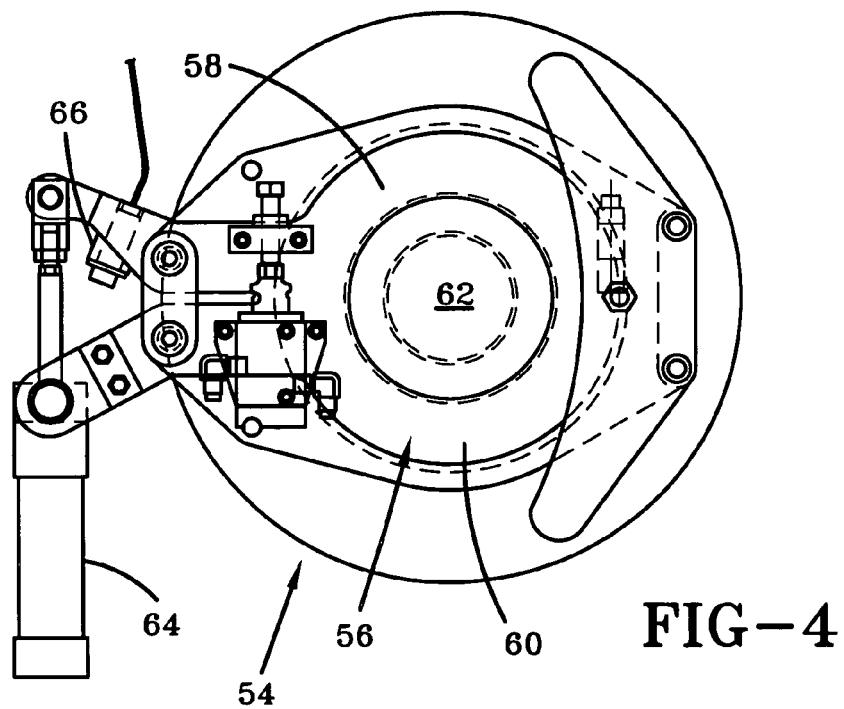
FIG. 4 is a top, cross-sectional view of a lock ring.

With reference to FIG. 4, locking means 54 is shown. Locking means 54 may take the form of a split lock ring 56. The split lock ring 56 may comprise a first arm 58 and a second arm 60. First and second arms 58, 60 define a hole 62 therebetween. The opening and closing of these lock rings 56 may be controlled by a pneumatic cylinder 64. Further, the lock ring 56 may further comprise a proximity switch sensor 66 so that the first and second arms 58, 60 maintain the appropriate position during the opening and closing of the lock ring 56.

Figure 3:
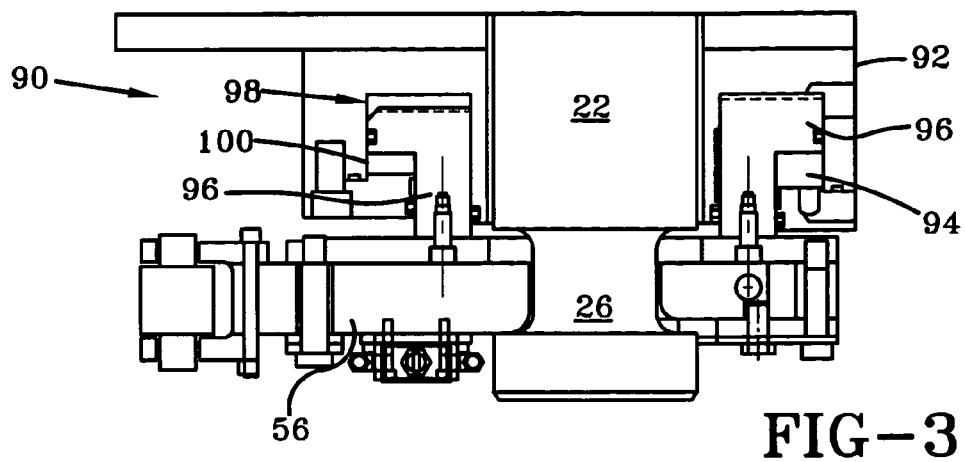
FIG. 3 is a cross-sectional view of the second end of a locking rod showing the cylinder mechanism and the locking means.

With reference to FIG. 3, cylinder mechanism 90 is shown in the squeeze condition (left side) and the release condition (right side). In the present invention, the cylinder mechanism may take the form of a hydraulic squeeze cylinder 92. The cylinder 92 comprises a chamber 94 having a floating piston 96 disposed therein. The piston 96 has a squeeze side 98 and release side 100. As shown in FIG. 3, the lock ring 56 is adapted to encircle the notched second end 26 of the lock rod 22. A fluid is introduced into the squeeze side 98 of the piston 96, which results in a downward axial force, which pushes down on the lock ring 56, which then contacts and pushes down on the lock rod 22, resulting in tension in the lock rod 22. In other words, the cylinder mechanism is adapted to move or force the locking means to the surface of said lock rod. The stroke of the piston 96 may be an inch or any other distance chosen with sound engineering judgment. Separate locking means 54 and cylinder mechanism 90 may be used for each of the lock rods 22. It is also contemplated that the cylinder mechanism 90 may have a spring to bias the piston 96 upwards (not shown).

As previously stated, the length of lock rods in previous devices is very critical because shorter lock rods will bear more stress and strain than longer lock rods. This results in increased cost to provide for bigger and stronger lock rods, as well as increased maintenance. Because the self-adjusting stroke length of the piston 96 and the common supply of pressure to the cylinder mechanism 90, equal force will be applied to each lock rod regardless of the varying lengths of the individual lock rods 22. Any imperfections in the threads 30 of the adjustment mechanism 28 and/or any imperfections in the lengths of the lock rods 20 are resolved through the tension produced by the hydraulic cylinder 92.

By means of the adjustment mechanism 28, and more specifically, through the multiple nuts 34, the nuts 34 are turned in unison by a connection, which may be a chain drive, which in turn elevates the lock rods 22 to the desired height for a particular mold. This allows for a correct mold height to be set as different molds are changed within the tire press 10. This can be done automatically with proximity sensors (not shown). During a mold change, the lock rods 22 of the tire press 10 are in their most upright position. When the tire press 10 is closed on the molds, the lock rods 22 are driven down until it is sensed that they are in the locking position. At such time, the proximity sensors will sense the locking position and automatically stop the mold height adjustment.

When the hydraulic cylinder 92 is energized, it will push to the position shown in the left side of FIG. 3 and put force on the lock rod 22. The rod 22 is pulling on the upper mold 14 and into the lower mold 18. The axial forces experienced by the lock rods 22 are very even because the top plate 12 is being brought down by three points, which will level itself through hydraulic cylinders 92 which are all connected together with the same hydraulic supply line. Hydraulic oil pressure enables this equalization and gives a very equal and parallel pull down. This results in a more even and parallel squeeze of the mold.

When the cylinder mechanism 90 pushes down on each of the lock rods 22, a centerline through the shaft of all three lock rods 22 will have equal pull down at the same time. The pressure is evenly distributed among each lock rod 22. Thus, an advantage is gained on equal distribution of stresses and equal deflection on the bottom plate 16 and top plate 12. Further, while deflection is occurring with the lock rod 22, the guide rods 20 experience virtually zero axial forces since they are independent of the lock rods 22.

In yet another embodiment of the invention, springs may be utilized to conform with guide tubes 82. When the hydraulic cylinders 92 pull the lock rods 22 downward, it is possible that deflection would reach the guide tubes 82. The springs would actually release the guide tubes 82 to allow its conformity with the axis of the guide rods 20. More specifically, a flange would lift so that the guide tube 82 would continue to experience little or no axial forces or bending forces.

Because the lock rods 22 are equally spaced and are utilized in conjunction with floating pistons 92, the balanced tension results in a perfect parallel plane between the top and bottom plates 12, 16. Each of the lock rods 22 experiences equal deflection, which is no more than 0.005 inches. This is attributed to the lock rods 22 being equally spaced about the perimeter of the molds 14, 18 and the thickness of the top and bottom plates 12, 16, which have a height up to six inches. This configuration also results in a very flat, parallelism and concentricity of the molds 14, 18. Another advantage of this configuration is the elimination of irregularly shaped welded structural supports for the top plate 12 and/or bottom plate 16 to secure the top and bottom molds 14, 18. Welds in the squeeze area and load path are eliminated.

Having just described the present invention, its operation will now be described. A tire press 10 as previously described is provided. The tire press 10 is closed by lowering the upper mold 14 to the bottom mold 18. The locking means 54 is locked to the second end 26 of lock rod 22. More specifically, the pneumatic cylinder 64 is actuated so that the first and second arms 58, 60 of split lock ring 56 encircle the notched second end 26 of the lock rod 22. Upon closure of the lock ring 56, the locking means 54 is secured to the second end 26 of the lock rod 22. Next, fluid, such as a hydraulic fluid, is injected on the squeeze side 98 of the piston 96. The pressure created by the fluid forces the piston 96 downward, thus pushing down on the lock ring 56. The lock ring 56 moves downward until it contacts the lock rod 22. As such, tension is placed on the lock rod 22 with the cylinder mechanism 90. This result is a locked tire press 10. In order to unlock the tire press 10, fluid is injected on the release side 100 of the piston 96. Fluid is then removed from the squeeze side 98 of the piston 96. The lock ring 56 moves upward and the first and second arms 58 can be opened. Upon release of the lock ring 56, the tire press 10 is unlocked.

The guide rods 20 are offset at an angle in order to reduce the overall width of the tire press 28. It is advantageous to make the tire press 10 as compact as possible so that it can be accommodated by existing factory spaces. The orientation of the guide rods 20 and lock rods 22 provide for such an advantage. Further, because of the present invention, the overall height of the tire press 10 is reduced, such that pits may not be needed to accommodate the tire press 10.

Figure 5:
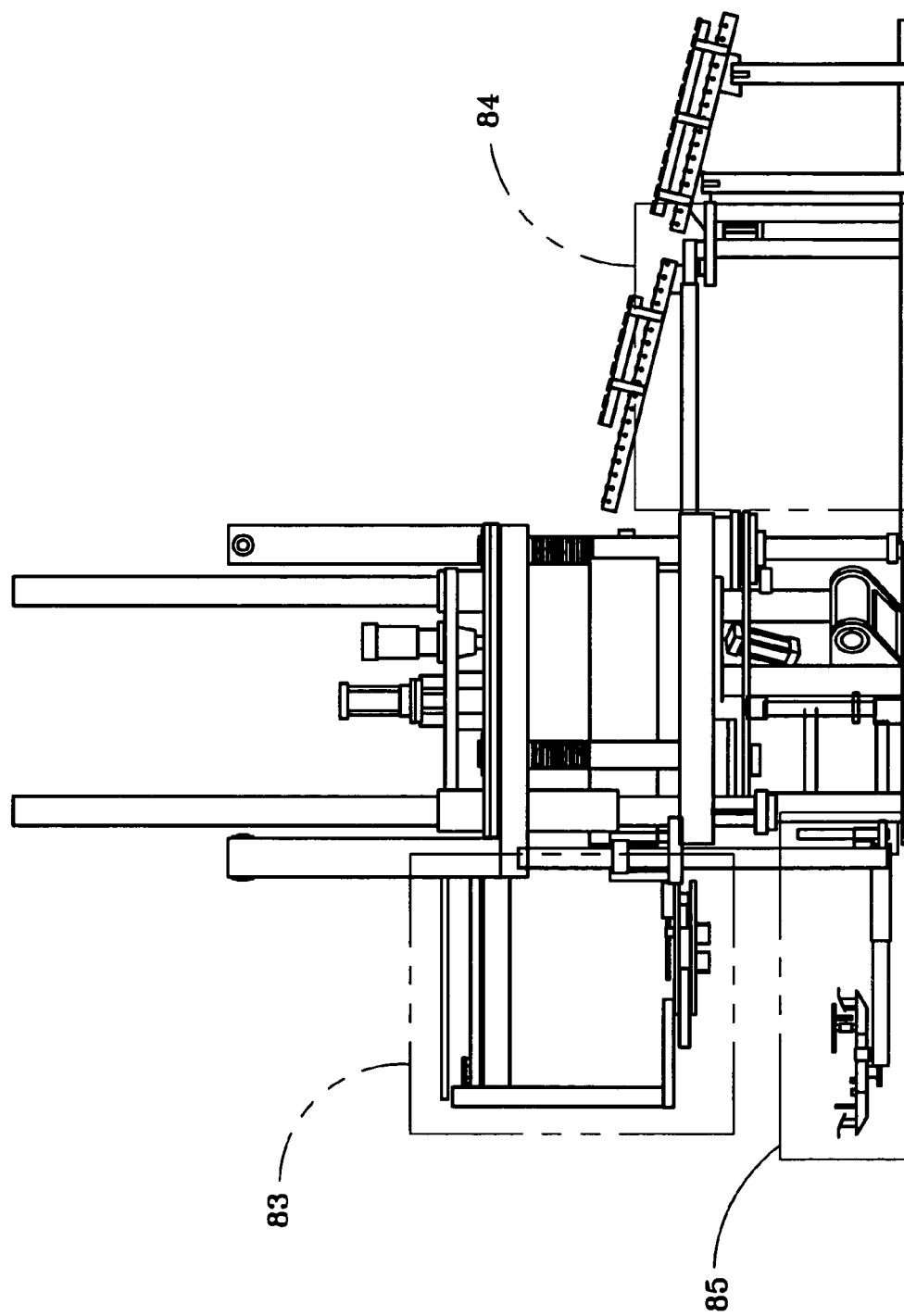
FIG. 5 is a side elevational view of the loader, unloader and green tire holder of the tire press.

With reference to FIG. 5, the tire loader assembly 83 is attached to the top plate 12 and travels up and down with the movement of top plate 12. When the loader assembly 83 is moved in under top plate 12 top plate 12 is lowered to place the tire over the bladder mechanism and into the bottom half of the mold. This method provides for a faster press cycle time, elimination of a separate lifting mechanism for the loader, and better precision placement of the tire onto the bladder mechanism.

The tire unloading mechanism 84 extends into the press to remove the cured tire by lifting it vertically over the bladder and then horizontally out the rear side of the press. The unloading mechanism then retracts down vertically and deposits the cured tire on the take away conveyor or it can delay placement of the tire on the take away conveyor and maintain the tire on the unloader arms during the next cure cycle so that the cured tire cools in a level position and does not strike any objects such as conveyor rolls while in a hot and sensitive condition. When the unloader does retract fully down it passes through and below the take away conveyor at the rear of the press. This allows better access to the rear of the press for operation, mold change and maintenance. It also provides for a more gentle and exact placement of the tire onto the take away conveyor.

The green tire holder 85 receives a green or uncured tire from a man or other mechanical delivery device. The holder then rotates horizontally to a location centered under the loading mechanism 83. The holder then lifts the tire vertically until the loading mechanism 83 can expand and attach to the tire. The holder then retracts down and rotates back to the starting position for the next tire. This method reduces the motions of the loader assembly, causes the loader to be more precise for the final placement of the tire into the mold, and provides more safety for the operator than in the case where a loader drops to take a tire from a fixed holder.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof. Having thus described the invention, it is now claimed:

What is claimed is:

1. An apparatus, comprising:
   an upper mold;
   a first top plate per upper mold, said top plate having the upper mold;
   a single bottom plate having a bottom mold, said bottom mold having an upper surface defining a first plane;
   three lock rods per top plate, each of said lock rods having a first end and a second end, each of said lock rods having a surface;
   locking mechanisms operatively connected to each of said lock rods, wherein said locking mechanisms are operatively connected to said bottom plate;
   cylinder mechanisms operatively connected to said locking mechanisms wherein said cylinder mechanisms are adapted to move said locking mechanisms to said surface of said lock rods, said cylinder mechanisms also adapted to place tension on said lock rods, wherein each of said cylinder mechanisms is a hydraulic cylinder, said cylinder mechanisms being supplied with hydraulic fluid from a common source, each of said cylinder mechanisms having a floating piston positioned therein, said floating piston having a self-adjusting stroke;

a loader assembly operatively connected to said top plate; and wherein a lower surface of said upper mold defines a second plane, said top plate adapted to adjust via the self-adjusting stroke of said floating pistons such that said second plane is parallel to said first plane such that equal force is applied to each of said lock rods which results in uniform force being applied to said molds.

2. The apparatus of claim 1, wherein said loader assembly is adapted to travel up and down with said top plate.

3. The apparatus of claim 2, further comprising:
a bladder mechanism;
wherein said loader assembly is positioned below said top plate such that the top plate can be lowered to position a tire over said bladder mechanism and into said bottom mold.

4. An apparatus, comprising:
an upper mold;
a first top plate per upper mold, said top plate having the upper mold;
a single bottom plate having a bottom mold, said bottom mold having an upper surface defining a first plane;
three lock rods per top plate, each of said lock rods having a first end and a second end, each of said lock rods having a surface;
locking mechanisms operatively connected to each of said lock rods, wherein said locking mechanisms are operatively connected to said bottom plate;
cylinder mechanisms operatively connected to said locking mechanisms wherein said cylinder mechanisms are adapted to move said locking mechanisms to said surface of said lock rods, said cylinder mechanisms also adapted to place tension on said lock rods, wherein each of said cylinder mechanisms is a hydraulic cylinder, said cylinder mechanisms being supplied with hydraulic fluid from a common source, each of said cylinder mechanisms having a floating piston positioned therein, said floating piston having a self-adjusting stroke;
an unloading mechanism adapted to extend into said apparatus to remove an associated cured tire; and
wherein a lower surface of said upper mold defines a second plane, said top plate adapted to adjust via the self-adjusting stroke of said floating pistons such that said second plane is parallel to said first plane such that equal force is applied to each of said lock rods which results in uniform force being applied to said molds.

5. The apparatus of claim 4, wherein said unloading mechanism is adapted to move the cured tire vertically.

6. The apparatus of claim 4, wherein said unloading mechanism is adapted to move the cured tire horizontally.

7. The apparatus of claim 4, wherein said unloading mechanism is adapted to move the cured tire vertically and horizontally.

8. The apparatus of claim 7, wherein said unloading mechanism is adapted to move the cured tire vertically over a bladder mechanism and horizontally out of the apparatus.

9. The apparatus of claim 4, wherein said unloading mechanism is adapted to retract vertically to deposit the cured tire on a take away mechanism.

10. A tire press, comprising:
an upper mold;
a first top plate per upper mold, said top plate having the upper mold;
a single bottom plate having a bottom mold, said bottom mold having an upper surface defining a first plane;
three lock rods per top plate, each of said lock rods having a first end and a second end, each of said lock rods having a surface;
locking mechanisms operatively connected to each of said lock rods, wherein said locking mechanisms are operatively connected to said bottom plate;
cylinder mechanisms operatively connected to said locking mechanisms, wherein said cylinder mechanisms are adapted to move said locking mechanisms to said surface of said lock rods, said cylinder mechanisms also adapted to place tension on said lock rods, wherein each of said cylinder mechanisms is a hydraulic cylinder, said cylinder mechanisms being supplied with hydraulic fluid from a common source, each of said cylinder mechanisms having a floating piston positioned therein, said floating piston having a self-adjusting stroke;
a tire loader, the tire loader having a loading mechanism operatively connected to the press, wherein said tire loader is adapted to move upwards and downwards; and
wherein a lower surface of said upper mold defines a second plane, said top plate adapted to adjust via the self-adjusting stroke of said floating pistons such that said second plane is parallel to said first plane such that equal force is applied to each of said lock rods which results in uniform force being applied to said molds.

11. The tire press of claim 10, wherein said loading mechanism is operatively connected to said first top plate, said loading mechanism adapted to travel upward and downwards with said first top plate.

12. The tire press of claim 11, wherein said loading mechanism is adapted to move under said first top plate such that said first top plate can be lowered to position an associated tire over a bladder mechanism and into said bottom mold.

13. The tire press of claim 11, further comprising a tire holder having a holding mechanism for a green tire, wherein said green tire holder is adapted to rotate horizontally to a predetermined position.

14. The tire press of claim 13, wherein said predetermined position is centered under said loading mechanism.

15. The tire press of claim 13, wherein said green tire holding mechanism is adapted to move the tire vertically until the tire loading mechanism can operatively connect to the tire.

16. The tire press of claim 15, wherein said green tire holder is adapted to retract downwards and rotate back to its starting position.

* * * * *